Oct. 3, 1972          N. M. BRODY          3,695,982
THREE-DIMENSIONAL PLASTIC COLORED ARTICLE
Filed July 10, 1970                    2 Sheets-Sheet 1
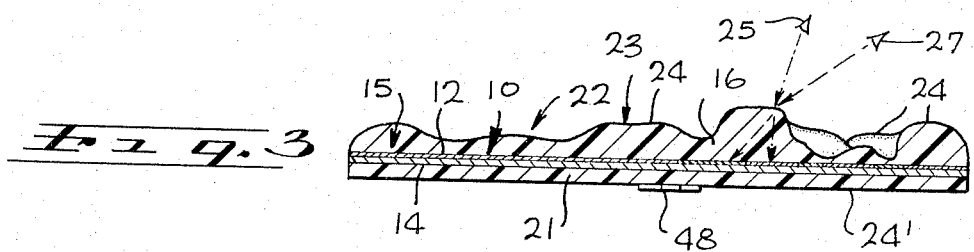
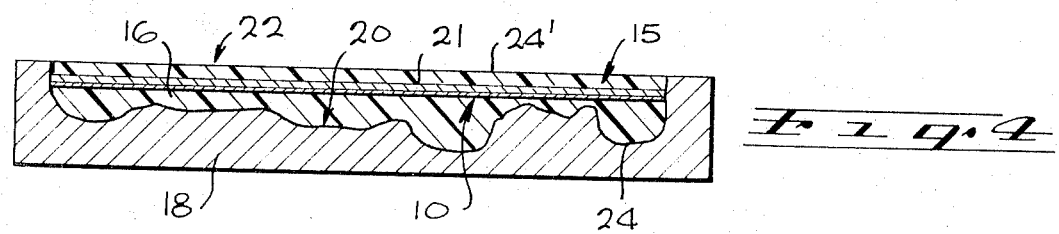
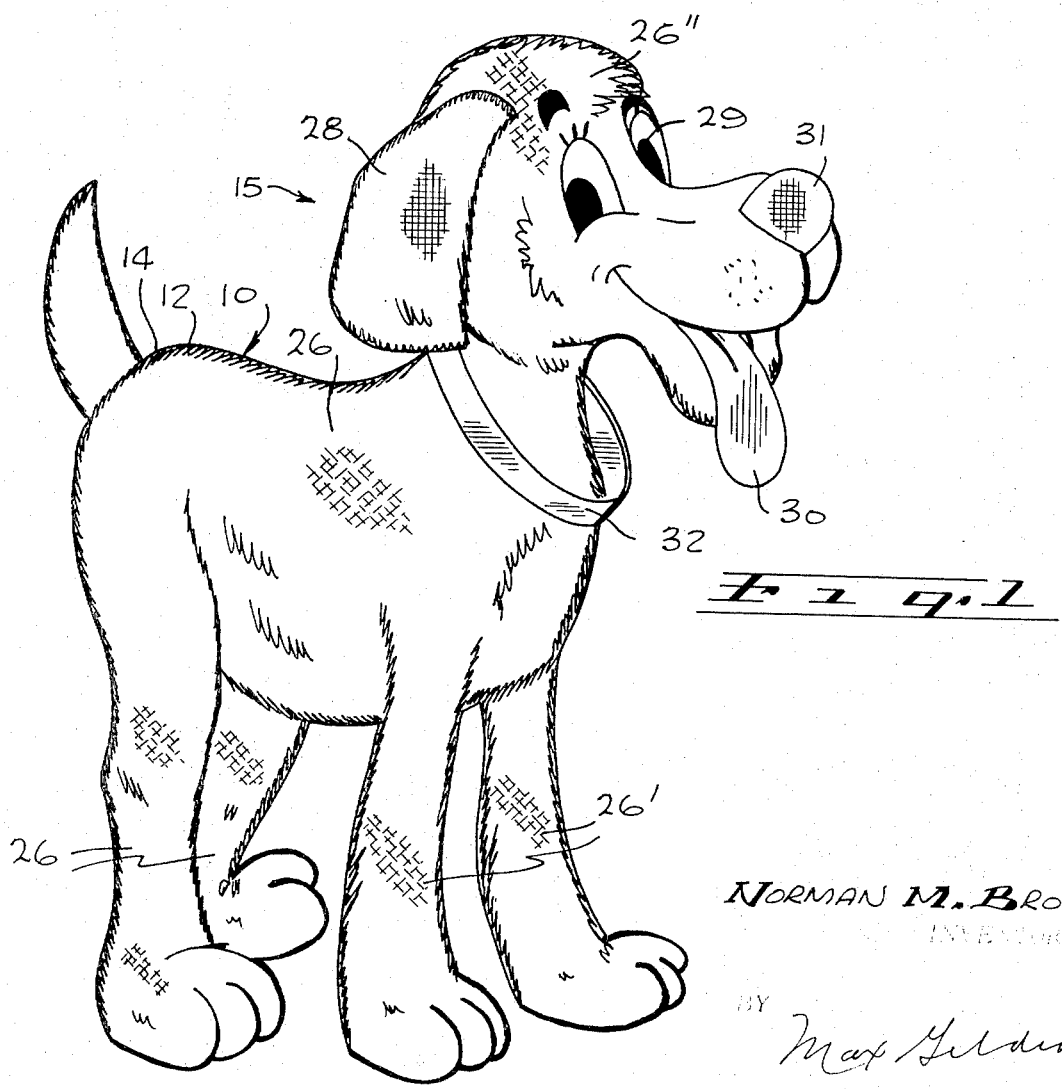
NORMAN M. BRODY
INVENTOR
BY Max Gilden
ATTORNEY

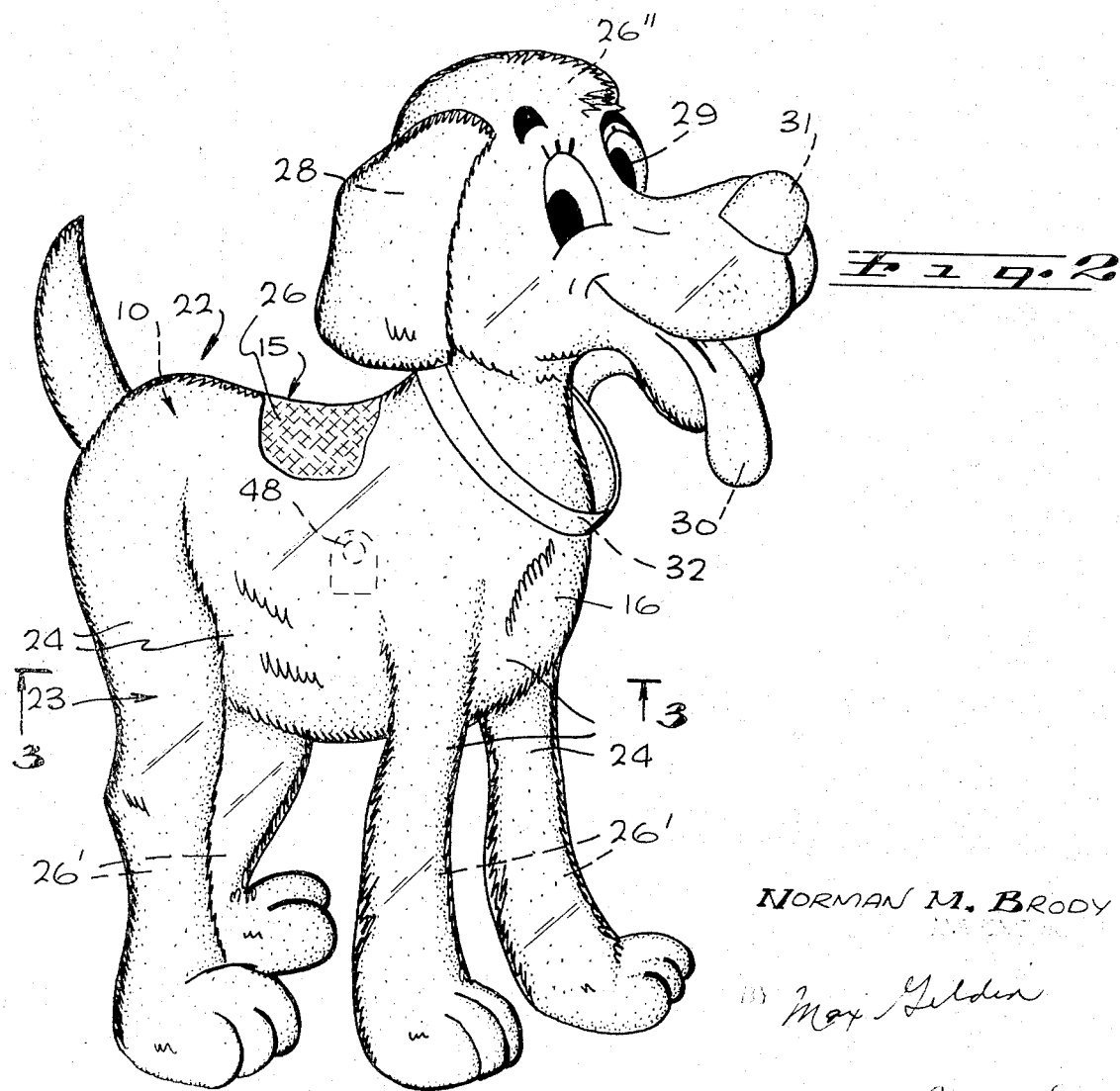

United States Patent Office 3,695,982
Patented Oct. 3, 1972

3,695,982
THREE-DIMENSIONAL PLASTIC COLORED ARTICLE
Norman M. Brody, Los Angeles, Calif., assignor to Norman Industries, Inc., Santa Fe Springs, Calif.
Filed July 10, 1970, Ser. No. 53,918
Int. Cl. B44f *1/08, 7/00*
U.S. Cl. 161—5         11 Claims

ABSTRACT OF THE DISCLOSURE

Three dimensional plastic colored article, e.g. reproduction of a cartoon character and the like, useful for decorative purposes such as wall plaques, comprising a clear transparent polyester cast resin body having a colored fiber glass paper inlay embedded in the resin, such inlay preferably being a silk screened multicolored configuration or characterization, the cast resin body having an external shape corresponding to the external shape of the colored inlay, forming a three dimensional plastic duplicate of the colored inlay having the corresponding coloration and outlines of the colored fiber glass paper inlay, and creating a three dimensional effect to the eye of an observer. Process for making such article wherein a clear polyester liquid resin is poured into a mold having the outlines of the colored inlay to be reproduced, such as a carton character, the colored, e.g. multicolored silk screened, fiber glass paper inlay is then embedded in the wet resin in the mold, and the resin is allowed to set therein.

---

This invention relates to production of three dimensional colored plastic articles and is particularly concerned with the provision of three dimensional colored, preferably multi-colored, polyester resin cast or molded articles, formed by embedding a colored or multicolored fiber glass paper inlay, into the cast resin body, so as to obtain a three dimensional duplicate of the colored inlay, and particularly creating a three dimensional animated effect. The invention is also concerned with procedure for producing such colored plastic article, such articles particularly having decorative utility, e.g. as wall plaques, and the like.

U.S. Pat. 3,041,217 discloses the use of plastic laminates prepared by impregnating glass fiber materials with polymerizable unsaturated polyester resin compositions and subjecting the resin to polymerization. The patent further discloses that through the use of color and design on the mats of thermoplastic fibers, decorative effects can be achieved in the plastic laminate.

Pat. No. 2,579,949 discloses the formation of improved laminated products resulting from the impregnation of woven glass fiber cloth with a flexible thermosetting resin composition such as a polyester, placing the impregnated glass fiber cloth between paper sheets impregnated with the same resin composition, and polymerizing the resin.

However, to applicant's knowledge, the prior art as represented by the above noted patents, fails to disclose or teach incorporation of colored, particularly multicolored, reproductions in a cast resin body, such as that of a polyester, to produce a three dimensional colored article which affords a three dimensional, e.g. animated effect, which is highly pleasing, such plastic articles being particularly suited for decorative purposes such as wall plaques.

According to the present invention, applicant has found that by forming a colored, particularly multicolored reproduction, pattern or design, such as that of a cartoon character, preferably by silk screening, on a fiber glass paper, and embedding said colored fiber glass paper in a clear polyester resin in a mold having the shape and configuration of the colored fiber glass paper, and the resin allowed to set, a three dimensional plastic colored article is produced comprising a clear transparent polyester cast resin body of substantial thickness, having the colored, or multicolored, fiber glass paper inlay embedded in the resin, and forming a three dimensional plastic duplicate of the colored fiber glass inlay, having the corresponding coloration and outlines of such colored inlay, and creating a pleasing three dimensional effect when viewed.

As will be pointed out in greater detail below, the improved article so produced, e.g. in the form of a three dimensional replica of a multicolored cartoon character, produced according to the invention, is based on certain features of the invention noted below.

Of particular importance, the use of a substantially transparent or translucent permeable fiber glass paper as inlay in the cast polyester resin, duplicates the glasslike clear effect of the polyester resin which is accomplished as the fiber glass paper inlay "wets" out after it is embedded in the wet resin, and becomes "transparentized" therein. By the term "transparentized" is meant that after the fiber glass paper having the colored reproduction, or the like, is embedded in the resin, and the resin has set, only the colored representation is visible through the clear polyester resin, and the fiber glass paper becomes substantially invisible.

In order to achieve the exact duplication of the colored or multicolored fiber glass inlay by visual observation through the cast resin body, according to a preferred embodiment, certain dyes or inks are used, especially solvent type dyes, as noted below, for coloring the fiber glass paper.

According to still another feature of the invention, forming a preferred embodiment, the fiber glass paper employed as inlay is colored on either side or on both sides of the paper by a conventional silk screening process in order to obtain great sharpness and detail of the colored reproduction or characterization of the fiber glass inlay, when the cast resin body containing such colored or multicolored paper inlay is viewed. This also eliminates hand labor and the high cost thereof for otherwise applying multicolored details of a reproduction, e.g. a multicolored cartoon character, on the fiber glass paper inlay.

The resin preferably employed in accordance with the invention is a conventional clear polyester casting resin available commercially in the trade from various manufacturers. Generally such polyester resins are produced by reaction of dibasic acids such as maleic acid, with dihydric alcohols, and usually containing an unsaturated monomer such as styrene. The polyester is available commercially in the first stage of polymerization, that is the ester formation stage. Just prior to use, that is just prior to pouring in a mold, a suitable peroxide catalyst such as methyl ethyl ketone peroxide, is added, to effect hardening, which can take place at room temperature over an extended period, or such hardening can be accelerated by the application of heat. Mixtures or blends of various types of polyester resins can be employed so as to obtain a desired type of cast resin product, which can be either hard and glass-like or relatively soft and flexible and hence shatter-proof if dropped.

The glass fiber paper employed, which is colored according to a predetermined color design, preferably by silk screening, is a commercially available material which can range in thickness from about 5 to about 10 mils, e.g. about 7 mils. The characteristics of the fiber glass paper which is embedded in the resin according to the invention, allows the resin to soak through the paper without fracturing the resin body. In other words, the fiber glass paper is compatible with the polyester resin, and the resin in effect assimilates the fiber glass paper and the colored reproduction thereon as part of the resin body.

It has been found particularly that only fiber glass paper is suitable for purposes of the invention. Other papers have been tried, such as rayon paper, but were generally unsuitable due to the fact that bubbles tend to develop in the resin adjacent the paper inlay when it is placed in the wet resin, and the resulting cast polyester body containing such paper inlay tends to fracture because the paper is "rigid" and will not give. Such bubble formation and fracturing does not occur when employing fiber glass according to the invention, and when employing such colored fiber glass inlay, as previously noted the resin "wets" the permeable fiber glass paper and passes through it to completely assimilate the inlay in the resin body to form an essentially integral unit, and bringing out in detail the colored reproduction on the paper inlay. Also, when rayon and other papers are employed the inks or dyes thereon tend to migrate and result in discoloration.

As previously noted, in preferred practice according to the invention, a colored pattern, reproduction, cartoon character, or the like, is applied to a surface of the fiber glass paper inlay by a silk screen process, particularly to produce a multicolored reproduction, such as a multicolored cartoon character. Such silk screen process is well known and the details thereof do not form a part of the present invention. In such process, which produces very clear and distinct multicolor representations, various colors are individually applied to the surface of the fiber glass paper by means of a silk screen. The various compositions or formulations which can be employed in the silk screen process for producing a colored or multicolored reproduction on the fiber glass paper, are generally resin formulations containing a suitable dye or pigment in various resin vehicles. It has been found that the use of solvent type dyes particularly produces the best results in the form of clear sharp colors when the colored fiber glass paper inlay is embedded in the polyester resin. Representative of such solvent type dyes which are preferably employed for coloring the fiber glass paper by the silk screen process, are the coal tar dyes, which can be aniline dyes, monoazo dyes, anthraquinone dyes, and the like. Specific examples of such solvent soluble dyes are Oil Scarlet 6 G Base, marketed by Allied Chemical and GAF (General Aniline and Film Corp.), suddan yellow, marketed by GAF, Luxol Fast Brilliant Blue-MBSN, marketed by Dupont, and Azosol Brilliant Red BN, marketed by GAF. Solvents which can be employed in the formulations containing such solvent soluble dyes include for example acetone, Cellosolve, ethyl alcohol, isopropyl alcohol, diacetone alcohol, and the like. Resins which are employed in the silk screen process for applying color to the fiber glass paper, to function as a vehicle and provide sufficient viscosity for the formulation in the silk screen process, include various types of resins such as cellulose acetate, cellulose acetate-butyrate, alkyd resins, ethyl cellulose, acrylics such as methyl methacrylate, polyurethanes, polyvinylidene chlorides and hydroxyethyl cellulose, either as homopolymers or copolymers, synthetic rosin, flake shellac, and the like.

Although not preferred, pigment dyes, which are not solvent soluble but are dispersible in the various media including solvents and resins, of the type noted above, can also be employed. Examples of such pigment dyes include phthalocyanine blue, benzidine yellow, and Wachung Red.

In producing the article in the form of a cast polyester resin containing the colored fiber glass paper inlay according to the invention, the liquid clear polyester resin is placed or poured into a mold having a predetermined shape and configuration, that is the bottom of the mold has a contour, corresponding to the external shape of the colored fiber glass paper to be embedded therein as an inlay, the fiber glass paper being die cut to the outer size and shape of the mold. Thus, where for example the fiber glass paper has printed thereon a multicolored representation of a cartoon character, such as a dog, the mold will have an irregular surface contour corresponding to the colored representation of the cartoon character. The polyester resin is then poured into the mold and the fiber glass paper inlay with the colored or multicolored reproduction on one or both surfaces thereof, usually on one surface, is embedded in the cast resin in the mold. As will be noted hereinafter, the mold can be only partially filled with a polyester resin, the colored fiber glass paper inlay then placed on the surface of the resin and additional resin poured over the fiber glass paper to fill the mold; or, alternatively the mold can be completely filled with the polyester resin, and the fiber glass paper inlay, with the colored or multicolored representation on the front or back surface thereof, is laid on the surface of the resin.

In any case, the resin permeates the fiber glass paper and wets same, without formation of bubbles in the plastic adjacent the fiber glass inlay and without fracturing the resin body or causing it to be displaced from its initial portion in the resin body.

After the color fiber glass paper inlay is embedded in the resin as noted above, the clear polyester resin containing such inlay is then permitted to set and harden. Such setting or curing of the resin can take place at ambient or room temperature (about 70° F.), but under these conditions setting is relatively slow. Accordingly, it is preferred to set or cure the polyester resin by heating at elevated temperature, e.g. in the range of about 90 to about 175° F., and passing the polyester resin body containing the fiber glass paper inlay through an oven at a suitable temperature at noted above, after which the cured resin part is readily removed from the mold.

After curing of the polyester resin, there is produced a three dimensional clear plastic body containing the colored fiber glass paper inlay embedded therein, the thickness of the resin body generally being substantially greater than the thickness of the fiber glass paper inlay. The polyester resin article is a three dimensional duplicate or exact replica of the colored or multicolored inlay, with a contoured front surface simulating the contours of the colored representation of the inlay and a flat or planar rear surface. Particularly where solvent dyes are employed in a silk screen process for producing the colored or multicolored fiber glass paper inlay, clear sharp outlines of the colored representation printed on the fiber glass inlay are obtained, the reflection and refraction of the light rays passing through the resin body from the colored paper inlay to the front contoured surface of the resin body producing a three dimensional effect when viewed at different angles, and particularly when the colored paper inlay is a multicolored character such as that of a dog, an animated effect is produced by this combination.

The invention will be more clearly understood by reference to the description below of preferred embodiments of the invention, in connection with the accompanying drawings, wherein:

FIG. 1 is a representation of a permeable fiber glass paper having a multicolored representation of a character in the form of a dog silk screened on one surface thereof;

FIG. 2 illustrates the article of the invention, wherein the colored fiber glass paper inlay of FIG. 1 is embedded in a polyester resin;

FIG. 3 is a cross section taken on line 3—3 of FIG. 2, showing the position of the colored fiber glass paper inlay in the cast resin body, and the surface contours of the cast resin body matching or simulating the configuration of the dog on the paper inlay;

FIG. 4 illustrates the procedure for embedding the colored paper inlay of FIG. 1 in a polyester resin to produce the article of FIGS. 2 and 3;

FIG. 5 illustrates an alternative method of embedding the colored fiber glass paper inlay in the polyester resin; and FIG. 6 is a cross section of the article produced according to the procedure illustrated in FIG. 5, and similar to the showing in FIG. 3.

The drawings are exaggerated for greater clarity.

Referring to FIG. 1, there is illustrated a colored character in the form of a dog at 10, which can be, for example, a cartoon character, and which is silk screened employing solvent type dyes onto one surface, that is the front surface 12, of a permeable fiber glass paper 14, forming the colored fiber glass paper or inlay 15. Illustrative types of fiber glass papers which can be used are those marketed as K-Mat 155 and 158, by Strathmore Paper Co. The properties of such papers are as follows:

| Property | K-Mat 155 | K-Mat 158 |
| --- | --- | --- |
| Basis weight (lbs/3,000 sq. ft.) | 22 | 22 |
| Thickness (mils) | 7 | 7 |

Referring now to FIG. 4, clear liquid polyester resin at 16 is poured into a mold 18, the mold having the surface contour 20 as a negative replica of the corresponding surface contour to be reproduced in the outer surface of the cast resin body, and corresponding to the external surface contours of the various parts of the body of the multicolored dog shown at 10 in FIG. 1. The front pour resin at 16 fills about ⅔ of the height of the mold, and the fiber glass paper inlay 15 containing the colored dog 10 of FIG. 1 is then placed on the surface of the body of liquid resin 16, with the colored dog 10 on the front surface facing the bottom or surface contour 20 of the mold. Additional liquid polyester resin at 21 is then poured over the colored fiber glass paper inlay 15 to the predetermined depth or predetermined thickness of the cast resin body to be produced in the mold, such resin 21 constituting a second or back pour. The liquid resin permeates through the fiber glass paper 14 chiefly from the back uncolored surface thereof to the colored dog 10 printed on the front surface of the paper, completely wetting the paper without formation of bubbles in the resin adjacent the paper surfaces.

Following a short period of setting at ambient temperature in the mold, e.g. about 20 to about 30 minutes, the resulting article or unit 22, comprising the resin body formed of the resin pours 16 and 21 having embedded therein the fiber glass paper inlay 15 disposed parallel to the rear surface 24' of the resin body is passed through an infrared oven oerating at a temperature ranging from about 140 to about 160° F. The unit 22 is permitted to remaining in the oven for about 20 to about 30 minutes, and is then removed and permitted to cool.

The resulting article 22, illustrated in FIGS. 2 and 3 of the drawing, is in the form of a hard clear transparent body 23 formed of the resin bodies 16 and 21, having a contoured front surface 24 and a planar rear surface 24', and in which all of the colors and details of the colored dog on the front surface of the colored fiber glass paper inlay 14, together with the corresponding irregular surface contours 24 of the resin body, combine to produce a three dimensional exact replica of the multicolored dog, which appears to be animated when the article is viewed through the front surface of the resin body and is placed at different angles with respect to the eye of an observer, as indicated at 25 and 27 in FIG. 3. The respective colored portions of the dog, such as the orange colored body 26, legs 26' and head 26", the black ears 28, eye balls 29 and nose 31, the pink tongue 30 and the blue collar 32, are sharp and clear and the lines of demarcation between the respective colored portions are also very sharp. It is noted that the dyes or pigments of which the colored dog is formed remain in the surface of the fiber glass paper inlay and do not permeate, wander or exude into the surrounding polyester resin body 23 which remains clear and transparent.

Referring now to the alternative embodiment of FIG. 5, for embedding the colored fiber glass paper inlay into the polyester resin, in this modification liquid polyester resin indicated at 34 is poured into the mold 18 having the same contour 20 as in FIG. 4, the resin 34 being poured into the mold approximately to the top thereof. A colored permeable fiber glass paper with the same multicolored characterization of the cartoon character of a dog as in FIG. 1, silk screened thereon, is provided, as indicated at 40. However, in this case the multicolored dog is silk screened in reverse on the back surface 36 of the fiber glass paper 38.

The resulting colored fiber glass inlay 40 is placed on the upper surface of the liquid resin 34 in the mold, with the reverse printed colored characterization of the dog 10' on the rear surface thereof, and hence such inlay 40 and colored dog 10' are essentially located in the rear surface of the resin body 34.

The liquid resin 34 permeates through the fiber glass paper 38 from the front surface 42 of the colored fiber glass inlay, to the colored representation of the dog 10' on the back surface of the paper. This completely wets the paper and no bubbles are formed adjacent the surface 42 of the paper in FIG. 5, as is also the case in the embodiment of FIG. 4 above.

The remainder of the process for curing the cast resin body 34 having the colored fiber glass paper inlay 40 therein is the same as that described above in relation to the curing of the corresponding resin body containing the colored fiber glass inlay described above with respect to FIGS. 3 and 4.

Referring to FIG. 6, the result, following setting and cooling of the resin body 34 containing the colored fiber glass inlay 40 illustrated in FIG. 5, is the three dimensional article indicated at 44, which is very similar to the article 22 formed of the resin body containing the colored paper inlay produced according to FIG. 4. That is, the article 44 of FIG. 6 is in the form of a plaque in which the corresponding colored portions of the dog 10' silk screened on the back surface of the fiber glass paper 38 are sharply visible through the clear cast resin, and the lines of demarcation between the colored portions of the dog are very sharp. As in the case of the embodiment of FIGS. 2 and 3, the resulting surface contours 45 of the cast resin 34, correspond to the portions of the dog, with raised portions indicating the various parts of the dog's body such as the legs, ears, nose and tongue. Hence there is produced a remarkable likeness of the cartoon character dog on the fiber glass inlay, provided in the articles 22 and 44 of FIGS. 3 and 6, which in the case of FIG. 6 is somewhat magnified because of the position of the colored dog 10' in the back layer of the fiber glass paper 38 and at the back surface of resin body 34, at a substantial distance from the front surface of the resin body, corresponding to the contours 20 of the mold.

In the transparent cast and colored resin bodies or plaques produced according to the methods described above and illustrated in FIGS. 4 and 5, the fiber glass paper inlay 15 or 38 is barely discernible in the resin body, with no signs of any bubbles or with no bleeding of dye from the fiber glass paper inlay. In the embodiments of both FIGS. 4 and 5, a lifelike highly animated characterization of the dog is produced particularly when, as previously noted, the article is placed at different angles with respect to the eye.

If desired a hook member 48, as indicated in FIGS. 2 and 3 can be embedded in the resin body at the rear flat surface thereof for hanging the article if it is to be used as a wall plaque.

If desired, in the embodiment of FIG. 4, the silk screen coloration of the dog can be silk screened in reverse on the rear surface of the fiber glass paper 14, and in the embodiment of FIG. 5, the multicolored silk screened representation of the dog can be placed on the front surface of the fiber glass paper 38, instead of on the rear surface thereof as shown in FIG. 5. Also, if desired, although not preferred, the colored representation or reproduction can be placed on both surfaces of the fiber glass paper, the colored representation being in reverse on the back side of the paper.

It will also be recognized that any type of colored pattern, reproduction, characteristization and the like, can be printed on one or both surfaces of the fiber glass paper inlay.

Although as previously noted, the colored or multicolored representation to be viewed through the polyester resin body, is preferably applied by silk screening on the fiber glass paper, especially employing solvent type dyes, other printing methods can be employed for applying coloration to one or both surfaces of the fiber glass paper inlay, employing various known coloring techniques.

The invention hereof is particularly designed for production of decorative articles such as wall plaques, but it will be understood that the articles produced according to the present process can be employed, e.g. as decorative articles, for any purpose.

From the foregoing, it is seen that the invention provides novel procedure for producing unique colored or multicolored polyester resin bodies having embedded therein a colored fiber glass paper, the resin body having a silhouette or outer contour and surface contours matching the apparent outer shape and surface contours of the colored configuration, and simulating the outer surfaces of the colored representation, e.g. cartoon character, on the fiber glass paper of the inlay.

While I have described particular embodiments of my invention for the purpose of illustration, it should be understood that other modifications and adaptations thereof may be made within the spirit of the invention, and hence the invention is not to be taken as limited except by the scope of the appended claims.

What is claimed is:

1. A three dimensional plastic colored article comprising a clear transparent polyester cast resin body having a colored fiber glass paper inlay embedded in said resin body, said cast resin body having an external shape corresponding to the external shape of said colored inlay, and having a thickness substantially greater than the thickness of said fiber glass paper inlay, forming a three dimensional plastic duplicate of said colored inlay, having the corresponding coloration and outlines of said colored fiber glass paper inlay, only the colored representation on said fiber glass paper inlay being visible through said clear polyester resin body, said fiber glass paper being substantially inivsible.

2. An article as defined in claim 1, said fiber glass paper inlay being multicolored, said cast resin body having a front surface and a rear surface, the front surface of said cast resin body being contoured to a predetermined shape in accordance with the multicolored design of said multicolored fiber glass paper inlay, and said three dimensional plastic duplicate of said colored inlay having the corresponding multicolored configuration of said inlay, and creating a three dimensional effect when said cast resin body containing said colored fiber glass paper inlay is moved into different angular positions with respect to the eye of an observer.

3. An article as defined in claim 1, said fiber glass paper inlay being multicolored, the front surface of said cast resin body being contoured to a predetermined shape in accordance with the multicolored design of said multicolored fiber glass paper inlay, the rear surface of said cast resin body being essentially planar, and said three dimensional plastic duplicate of said colored inlay having the corresponding multicolored configuration of said inlay, and creating a three dimensional effect when said cast resin body containing said colored fiber glass paper inlay is moved into different angular positions with respect to the eye of an observer.

4. An article as defined in claim 3, wherein said colored fiber glass paper inlay is disposed adjacent the rear surface of said cast resin body, said fiber glass paper inlay containing said multicolored configuration on the back surface thereof adjacent said rear surface of said cast resin body.

5. An article as defined in claim 3, wherein said colored fiber glass paper inlay is embedded in said cast resin body between the front and rear surfaces of said cast resin body, said fiber glass inlay containing said multicolored configuration on the front surface thereof and facing the front contoured surface of said cast resin body.

6. An article as defined in claim 3, wherein said multicolored fiber glass paper inlay has a silk screened multicolored configuration on at least one side of said fiber glass paper.

7. An article as defined in claim 6, wherein said silk screened multicolored configuration is formed from solvent type dyes.

8. An article as defined in claim 6, said cast resin body having both an external shape and a surface contour corresponding to the external and simulated shape and the coloration of said multicolored configuration silk screened on said fiber glass paper inlay, and forming a three dimensional exact replica of said multicolored inlay in said cast resin body, creating a three dimensional animated effect when said cast resin body containing said fiber glass paper inlay having said multicolored configuration silk screened thereon, is moved into different angular positions with respect to the eye of an observer.

9. An article as defined in claim 8, wherein said silk screened multicolored configuration is formed from solvent type dyes.

10. An article as defined in claim 8, wherein said colored fiber glass paper inlay is disposed adjacent the rear surface of said cast resin body, said fiber glass paper inlay containing said multicolored configuration on the back surface thereof adjacent said rear surface of said cast resin body.

11. An article as defined in claim 8, wherein said colored fiber glass paper inlay is embedded in said cast resin body between the front and rear surfaces of said cast resin body, said fiber glass inlay containing said multicolored configuration on the front surface thereof and facing the front contoured surface of said cast resin body.

References Cited
UNITED STATES PATENTS

| | | | |
|---|---|---|---|
| 2,404,136 | 7/1946 | Knauff | 161—18 |
| 3,264,164 | 8/1966 | Jerothe et al. | 161—6 |
| 3,440,129 | 4/1969 | Anselm | 161—5 |
| 3,518,146 | 6/1970 | Plympton | 161—5 X |
| 3,186,866 | 6/1965 | Claeys | 161—6 X |
| 2,980,574 | 4/1961 | Menzer | 161—6 |
| 3,312,197 | 4/1967 | Smith | 264—271 X |
| 3,364,090 | 1/1968 | Slipp | 161—5 X |
| 3,581,522 | 6/1971 | Wincklhofer | 161—19 X |
| 3,616,100 | 10/1971 | Morita | 161—5 |

HAROLD ANSHER, Primary Examiner

U.S. Cl. X.R.

161—6, 18, 19, 20, 138